United States Patent [19]

Ngian et al.

[11] Patent Number: 4,822,575

[45] Date of Patent: Apr. 18, 1989

[54] PROCESS FOR THE PURIFICATION OF ZIRCONIUM COMPOUNDS

[75] Inventors: Kian F. Ngian, Lower Templestowe; Angus J. Hartshorn, PasooeVale; David H. Jenkins, East Bentleigh, all of Australia

[73] Assignee: ICI Australia Limited, Victoria, Australia

[21] Appl. No.: 10,190

[22] PCT Filed: Apr. 22, 1986

[86] PCT No.: PCT/AU86/00109

§ 371 Date: Jan. 2, 1987

§ 102(e) Date: Jan. 2, 1987

[87] PCT Pub. No.: WO86/06362

PCT Pub. Date: Nov. 6, 1986

[30] Foreign Application Priority Data

May 2, 1985 [AU] Australia ............... PH0405

[51] Int. Cl.$^4$ ............... C01G 25/00; C01G 25/06
[52] U.S. Cl. ............... 423/82; 423/85; 423/545; 423/548; 423/520; 423/608; 423/DIG. 2; 106/450
[58] Field of Search ............... 423/82, 608, 85, 548, 423/DIG. 2, 545, 520; 106/299

[56] References Cited

U.S. PATENT DOCUMENTS

| | | | |
|---|---|---|---|
| 3,389,005 | 7/1968 | Kloepfer et al. | 106/299 |
| 3,672,825 | 6/1972 | Gambale et al. | 423/608 |
| 4,243,649 | 1/1981 | Brugger | 423/608 |
| 4,283,377 | 8/1981 | Fenner | 423/608 |
| 4,505,886 | 3/1985 | Cody et al. | 423/616 |
| 4,639,356 | 1/1987 | O'Toole et al. | 423/608 |
| 4,640,716 | 2/1987 | Cleland | 106/299 |
| 4,664,894 | 5/1987 | Suzuki et al. | 423/608 |

FOREIGN PATENT DOCUMENTS

| | | | |
|---|---|---|---|
| 2102391 | 3/1972 | France | 423/608 |
| 44-23975 | 10/1969 | Japan | 423/608 |
| 0127240 | 7/1985 | Japan | 423/608 |
| 1495267 | 12/1977 | United Kingdom | 423/608 |

OTHER PUBLICATIONS

College Chemistry an Introductory Textbook of General Chemistry, Linus Pauling, W. H. Freeman and Company, San Francisco, Calif., 1950, pp. 89 and 90.

*Primary Examiner*—Robert L. Stoll
*Assistant Examiner*—Paige C. Harvey
*Attorney, Agent, or Firm*—Cushman, Darby & Cushman

[57] ABSTRACT

The invention concerns processes for the preparation of zirconium compositions which on calcination form zirconia. The zirconium compositions are prepared by the addition of an ammonia source to an aqueous zirconium sulfate solution to give a solution pH in the range of from 0.1 to 2.5 and preferably 1.0 to 2.0. The zirconium composition precipitated from solution appears crystalline, is readily collected by filtration and has low levels of metallic impurities. Therefore, the process of the invention may be used to advantage in the purification zirconium compounds.

The invention also includes the zirconium compositions and processes for the purification of zirconium compounds including zirconia.

10 Claims, No Drawings

PROCESS FOR THE PURIFICATION OF ZIRCONIUM COMPOUNDS

This invention relates to processes for the purification of zirconium compounds, to zirconium containing compositions which are intermediates for the preparation of high purity zirconium compounds, to processes for the preparation of said intermediates, and in particular to processes for the purification of zirconium dioxide (zirconia; $ZrO_2$).

There is considerable demand for high purity zirconia for use in the electronics industry and in the production of partially stabilized zirconia. Much of the world's supply of zirconia is obtained from the naturally occurring mineral zirconium silicate (zircon; $ZrSiO_4$) and processes currently used to extract zirconia from zircon in general involve the thermal decomposition of zircon to give zirconia and silica or the chemical decomposition of zircon to give zirconia and derivatives of silica. However, the crude zirconia produced in this manner requires purification by further chemical treatment.

Thermal dissociation of zircon to give a mixture of zirconia and silica offers an economically attractive route to zirconia. The dissociated zircon product can be leached with a strong base such as caustic soda in order to dissolve the silica and leave zirconia or can be leached with a strong acid such as sulphuric acid to dissolve the zirconia and form a zirconium salt leaving undissolved silica. The caustic-leach process produces zirconia which may have a purity as high as 99.5% but which must be subjected to further chemical processing (typically involving dissolving the zirconia in an acid) to produce high purity zirconia. The acid-leaching process has the advantage of procuding an acidic solution of a zirconium salt or a water soluble zirconium salt which may be further processed to produce high purity zirconium compounds including zirconia.

The most favoured acid-leaching process involves the dissolution of crude zirconia in sulfuric acid to give zirconium sulfate solution. The zirconium values may then be recovered by basification to precipitate the basic sulfate or hydroxide (hydrous zirconia). For example, U.S. Pat. No. 3,389,005 teaches the precipitation of zirconium hydroxide from zirconium sulfate solution by the addition of ammonia. However, in practice the precipitates formed in this manner are gel-like and difficult to filter and occlude many impurities. For this reason precipitation of the basic sulfate is preferred although, as discussed by Farnworth et al ("Specialty Inorganic Chemicals: The Production, Properties and Uses of Zirconium Chemicals", R. THOMPSON (Ed.), The Chemical Society, London, 1980 at page 257), it is difficult to control conditions to obtain optimum precipitation of the basic sulfate from zirconium sulfate solution. Therefore, the procedure often followed is the conversion of the zirconium sulfate to zirconium oxychloride and the precipitation of the basic sulfate by the addition of sulfuric acid or a sulfate salt as taught in Japanese Patent Application Publication No. 23975/69.

It has now been found possible to produce high purity zirconium compounds, including zirconia, by the precipitation of zirconium compositions from aqueous zirconium sulfate solution at a low pH. This method has the advantages that said zirconium composition may be precipitated directly from zirconium sulfate solution, the precipitate may be readily collected by filtration and said zirconium composition may be readily converted to zirconium chemicals, including zirconia, which have very low levels of metallic impurities.

Accordingly the invention provides a process for the preparation of zirconium compositions which on calcination form zirconia which process comprises:

preparing an aqueous zirconium sulfate solution having a pH not greater than zero;

adding an ammonia source to said aqueous zirconium sulfate solution until the pH of said solution is in the range of from 0.1 to 2.5; and collecting the precipitated zirconium composition.

"Ammonia source" is used herein to mean anhydrous ammonia, aqueous ammonium hydroxide, ammonium salts and compounds and compositions which in said aqueous zirconium sulfate solution will generate ammonia or a salt thereof. A wide range of ammonium salts may be used but preferred ammonium salts include, for example, ammonium sulfate and ammonium carbonate as these salts do not introduce different anions, and hence further sources of impurities, into said aqueous zirconium sulfate solution.

Suitable compounds and compositions which generate ammonia or a salt thereof in said aqueous zirconium sulfate solution include certain organic amides, amines, and imides such as, for example, urea and hexamethylenetetramine.

Although not critical to the process of the present invention it is preferred to use a zirconium sulphate solution having a zirconium content of greater than 75 grams per liter (expessed as the oxide $ZrO_2$) and a sulphate content of greater than 180 grams per liter (expressed as $SO_4$).

In the process of the present invention the ammonia source is added to the aqueous zirconium sulfate solution until said solution reaches a pH in the range of from 0.1 to 2.5. Preferably the addition of the ammonia source is discontinued when the pH is in the range of from 1.0 to 2.0.

It will be evident to those skilled in the art that the preparation of an aqueous zirconium sulfate solution by the dissolution of a zirconium compound such as, for example, zirconia in sulfuric acid will result in an aqueous zirconium sulfate solution with a relatively high sulfate ion content. In the practice of the process of the present invention, it has been found to be preferable to add to the aqueous zirconium sulfate solution sufficient of the ammonia source to provide a molar ammonia concentration of twice the difference between the molar concentration of the sulfate and that of the zirconium (i.e. $NH_3$ (moles)=2[Zr(moles)—$SO_4$(moles)]).

During the addition of the ammonia source to the aqueous zirconium sulfate solution according to the process of the present invention it has been found that cloudy precipitates may initially form in said solution at the point of addition of said ammonia source. Therefore, preferably the ammonia source is added to the aqueous zirconium sulfate solution with vigorous agitation in order to disperse any initially formed cloudy precipitate and give a clear solution.

The temperature at which the aqueous zirconium sulfate solution is held during the addition of the ammonia source is not narrowly critical and depends to a large extent on the concentration of said aqueous solution. It will be appreciated by those skilled in the art that the addition of the ammonia source (basic) to said aqueous solution (acidic) will generate heat and in practice it has been found convenient to add the ammonia source to said aqueous solution at ambient temperature allowing the temperature of the solution to increase as the addition proceeds. However, solution temperatures above or below ambient temperature may be desirable and preferred temperatures may be determined without undue experimentation.

On completion of the addition of the ammonia source, in practice, it has been found convenient to allow the clear solution to stand and the zirconium compositions to precipitate. The zirconium compositions formed in this manner appear crystalline and may be readily collected by filtration. The zirconium compositions so collected may be washed, if desired. Said zirconium compositions are readily soluble in water and therefore are preferably washed with a saturated aqueous solution, preferably ammonium sulfate, or a polar water-miscible organic solvent such as, for example, methanol, ethanol or acetone.

After washing and drying, the zirconium compositions prepared according to the process of the present invention are in the form of white, friable, free-flowing, finely divided material. Elemental analysis indicates that the zirconium compositions prepared according to the process of the present invention comprise zirconium, ammonia, sulfate and, depending on the degree of drying, water. The ratio of the zirconium, ammonia and sulfate components of said compositions appears to depend on the initial zirconium, sulfate and ammonia concentrations of the solution from which said compositions crystallise.

The zirconium compositions prepared according to the process of the present invention are believed to be novel and therefore in a further embodiment the invention provides an ammonium zirconium sulphate composition chracterized in that it may be formed by crystallization from an aqueous solution of zirconium sulphate by adjusting said solution to a pH in the range of from 0.1 to 2.5 by the addition of an ammonia source.

In yet a further embodiment the invention provides a preferred ammonium zirconium sulfate composition comprising $NH_4$, $ZrO_2$ and $SO_4$ in the mole ratio of 2:2:3 and having an X-ray diffraction pattern hereinafter described in Example 1.

The zirconium compositions prepared according to the process of the present invention contain surprisingly low levels of metallic impurities. Therefore, the process of the present invention is eminently suitable for the preparation of high purity zirconium chemicals including zirconia. For example, the zirconium compositions of the present invention may be calcined to give white zirconia powder of high purity and containing surprisingly low levels of metallic impurities in comparison to zirconia produced from zirconium sulfate solutions by the precipitation of hydrous zirconia and its calcination to give zirconia. Alternatively, as the zirconium compositions of the present invention are readily soluble in water they may be dissolved in water and converted to the required zirconium compound or composition.

The process of the present invention may be used to advantage in the purification of zirconium compounds. For example, in general, zirconium compounds may be converted to the sulfate salt and treated according to the process of the present invention to obtain zirconium compositions of the present invention which may be converted to the required zirconium compound.

In a further embodiment the invention provides a process for the purification of a zirconium compound which process comprises:

converting the zirconium compound to zirconium sulphate by treatment of the zirconium compound with concentrated sulphuric acid;

dissolving the zirconium sulphate in water to form an aqueous solution of zirconium sulphate;

adding an ammonia source to said aqueous zirconium sulphate solution until the pH of said solution is in the range of from 0.1 to 2.5;

collecting the precipitated zirconium composition; and converting said zirconium composition to the required zirconium compound.

The process of the present invention may be used to particular advantage in the purification of zirconia obtained from sources such as, for example, the naturally occurring mineral baddeleyite, dissociated zircon obtained by the thermal dissociation of zircon into zirconia and silica, and recovered impure zirconia.

Therefore, in a further embodiment the invention provides a process for the purification of zirconia which process comprises:

leaching a crude zirconia-containing material with concentrated sulphuric acid at a temperature in the range of from 200° to 400° C. and collecting the insoluble product formed on cooling;

leaching the insoluble product with water to yield an aqueous solution of zirconium sulphate;

adding an ammonia source to said aqueous zirconium sulphate solution until the pH of said solution is in the range of from 0.1 to 2.5;

collecting the precipitated zirconium composition; and calcining the zirconium composition to give zirconia.

The invention is now illustrated by, but in no way limited to, the following Examples in which all parts are parts by volume, unless otherwise indicated and all percentages are percentages by weight, unless otherwise indicated.

EXAMPLE 1

This example illustrates the preparation of a zirconium composition according to the process of the present invention.

Dissociated zircon, obtained by the thermal dissociation of zircon, was leached with concentrated sulphuric acid at a temperature in the range of from 200° to 400° C. On cooling the slurry was filtered and the filter cake was dissolved in distilled water to give a solution having a zirconium content of approximately 90 grams per liter (expressed as $ZrO_2$) and a sulphate content of approximately 220 grams per liter (expressed as $SO_4$).

An aqueous solution of ammonia (16.5% by weight) was added slowly to the stirred aqueous zirconium sulphate solution and it was noted that a cloudy precipitate was formed at the point of addition of the ammonia and quickly dispersed on stirring to give a clear solution. The addition of aqueous ammonia was continued until the pH of the solution reached approximately 2 and then the clear solution was allowed to stand overnight.

After standing overnight at room temperature a white apparently crystalline precipitate was formed which was collected by filtration. The product powder was characterized by its X-ray diffraction pattern details of which are recorded below wherein the first figure is the D value in Angstroms and the relative intensity of each line is recorded as very very strong (vvs), strong(s), medium (m), weak (w), or broad (br). It should be noted that the diffraction pattern may appear unduly complicated due to high X-ray absorption by zirconium: D value in Angstroms, Relative Intensity: 13.6 vvs; 11.7, s; 9.5, m; 8.9m; 8.0, w; 7.45, m; 6.9, m; 5.0, w; 4.6, m; 4.0, w; 3.8, br; 3.5–3.4, br; 3.20, m; 3.10, w; 2.95, (br); 2.90, br; 2.79, m; 2.64, m; 2.54, m; 2.42, br; 2.18, br; 2.00, br; 1.88, w; 1.82, w; 1.75, w; 11.65, w.

The precipitate was washed with water and oven-dried at a temperature of 100° C. to give, as a white solid, the zirconium composition of the invention. (83% recovery based on zirconia after calcination).

Aqueous ammonia solution (16.5% by weight) was added slowly to the filtrate with stirring until the pH of the solution reached 7.4. The gel-like slurry was collected by filtration and was washed with water and oven-dried at a temperature of 100° C. to give, as a white solid, a residual product.

EXAMPLE 2

Samples of the zirconium composition of the invention and the residual product were calcined at 1000° C. for two hours to give zirconia which was analysed for impurities by repetitive X-ray fluorescence analysis using, as a standard for direct comparison, JNC 455 Spec-Pure Zirconium Oxide (Zirconium (IV) oxide) Batch No. S90420BR from Johnson-Matthey Chemicals Ltd.

The zirconia produced by calcination of the zirconium composition of the invention has a white powder and was found to contain:

uranium 18 ppm; thorium 12 ppm; iron 39 ppm; yttrium 69 ppm; titanium 15 ppm; and potassium 29 ppm (all expressed in terms of the element).

Using this analytical method, the calcium, silicon and aluminium content of the sample was determined as less than that of the standard.

The zirconia produced by calcination of the residual product was a light brown powder and was found to contain: yttrium 4520 ppm; uranium 1140 ppm; thorium 500 ppm; iron 1180 ppm; titanium 820 ppm; potassium 70 ppm; silicon 110 ppm; and aluminium 2180 ppm.

EXAMPLE 3

The procedure described in Example 1 was repeated using an aqueous solution having a zirconium sulphate concentration of 200 grams per liter.

The precipitate was collected by filtration and oven dried at 100° C. to give a white solid. (Zirconium recovery based on weight of zirconia obtained after calcination was 62%).

A sample of the product was calcined to give zirconia in the form of a white solid. Analysis of the sample using the method described in Example 2 showed that the product contained: yttrium 56 ppm; uranium 25 ppm; iron 11 ppm; titanium 15 ppm; and potassium 81 ppm (based on the weight of the element present). With the analytical method used, the thorium, calcium, silicon and aluminum content of the sample was determined as less than that of the standard.

EXAMPLE 4

A zirconium sulphate solution was prepared using the method of Example 1. Analysis gave a zirconium content of 100 grams per liter (expressed as $ZrO_2$) and a sulphate content of 240 grams per liter.

To two liters of this solution was added 5.3 moles of ammonia as a 16.5% w/v solution. The ammonia was added to the stirred zirconium sulphate solution in aliquots of approximately 50 ml volume over about 30 minutes.

When all the ammonia had been added the solution temperature was 35° C. The solution was stirred until it became clear. It was then cooled to room temperature and left to stand overnight.

The resulting precipitate was collected and washed with a mixture of 3 parts ethanol and 7 parts water, and dried at 50° C. giving 445 g of product. Loss on ignition at 1000° C. of a sample was 59.74% giving a yield based on $ZrO_2$ of 88.8%.

EXAMPLE 5

A sample of the zirconium composition prepared in Example 4 was calcined at 1000° C. for two hours and analysed by the same technique as that given in Example 2.

The zirconia produced by the calcination of the zirconium composition was a white powder and was found to contain:

Uranium 3 ppm; thorium undetectable; iron 1 ppm yttrium 75 ppm; titanium 5 ppm and potassium 25 ppm (all expressed in terms of the element).

Using this analytical method the calcium, silicon and aluminium content of the sample was determined as less than the standard.

EXAMPLE 6

A zirconium sulphate solution was prepared using the method for Example 1. Analysis gave a zirconium content of 192 grams per liter (expressed as $ZrO_2$) and a sulphate content of 457 grams per liter.

To 100 ml of this solution was added 22.5 g of hexamethylenetetramine dissolved in 100 ml of water. The clear solution was stirred for 3 hours and then left to stand overnight.

The resulting precipitate (a) was filtered and washed with a solution of 3 parts ethanol and 7 parts water.

Excess ammonia was added to the filtrate. The resulting precipitate (b) was collected and calcined at 1000° C. for 2 hours giving 3.5 g of a light brown powder.

By subtraction the $ZrO_2$ content of precipitate (a) was 15.7 grams, 82% yield based on $ZrO_2$.

EXAMPLE 7

A sample of precipitate (a) prepared in Example 6 was calcined at 1000° C. for 2 hours and analysed by the same technique used in Example 2.

The zirconia produced by the calcination of the zirconium composition was a white powder and was found to contain:

Uranium 30 ppm; thorium 28 ppm; iron 2 ppm; yttrium 160 ppm; potassium 45 ppm; calcium 22 ppm; silicon 45 ppm and aluminium 12 ppm.

EXAMPLE 8

This Example illustrates the purification of commercial zirconium sulfate tetrahydrate according to the process of the present invention.

A zirconium sulfate solution was prepared by dissolving commercial zirconium sulfate tetrahydrate in distilled water. Analysis of the solution gave a zirconium content of 195 grams per liter (expressed as $ZrO_2$) and a sulfate content of 338 grams per liter (expressed as $SO_4$).

To a 50 ml aliquot of this solution was added 7.53 g of ammonium sulfate. After dissolution of the crystals the total volume was made up to 80 ml by the slow addition of distilled water to the stirred solution.

To the above solution was added 17.96 ml of aqueous ammonium hydroxide solution (0.194 moles of a 10.8 molar solution). The quantity of ammonia to be added was calculated according to the formula

*Ammonia (moles) = 2[sulfate(moles) − zirconium (moles)].*

The ammonium hydroxide solution was added dropwise to the stirred ammonium sulfate solution over about 15 minutes. On completion of the addition the mixture contained some gelatinous precipitate and the mixture was gently agitated overnight (ca. 16 hours).

The resulting precipitate was in the form of white needle-like crystals which were collected by filtration, washed with methylated spirits and left to air-dry at room temperature for six hours. The product weighed 21.3 grams and the loss on calcining at 1000° C. was 61% giving a zirconium recovery of 86% based on zirconia.

EXAMPLE 9

Samples of the commercial zirconium sulfate tetrahydrate used in Example 8 and the zirconium composition prepared as described in Example 8 were calcined at 1000° C. for a period of 2 hours. The zirconia products formed were then analysed by the technique described in Example 2 and the results are given below.

| Impurity | Impurity Content of Zirconia (ppm) | |
|---|---|---|
|  | From Commercial Zirconium Sulfate | From Composition of Example 8 |
| Yttrium | 16 | 10 |
| Uranium | 9 | 9 |
| Thorium | 29 | BS |
| Iron | 168 | BS |
| Titanium | 233 | 41 |
| Calcium | 50 | BS |
| Potassium | 17 | BS |
| Silicon | 471 | BS |
| Aluminium | BS | BS |

(BS indicates a content below that of the analytical standard used)

EXAMPLE 10

Zirconium sulfate solution (112 ml) which by analysis had a zirconium content of 178 grams per liter (expressed as ZrO$_2$) and a sulfate content of 455 grams per liter was diluted to 200 ml with distilled water.

Ammonium carbonate (33.1 g) was added portionwise to the solution with vigorous stirring. On completion of the addition the solution was set aside and allowed to crystallise.

The resulting precipitate was in the form of white needle-like crystals which were collected by filtration, washed with 50% aqueous alcohol (120 ml) and dried in an oven at a temperature of 65° C. The product weighed 28.7 g and the loss on calcining at 1000° C. was 57% giving a zirconium recovery of 67% based on zirconia.

The filtrate on standing gave a second crop of crystals. After washing and drying the product weighed 5.4 g and the loss on calcining at 1000° C. was 59.6% giving a zirconium recovery of 12% based on zirconia.

The filtrate from the second crop of crystals was treated with a further 7.6 g of ammonium carbonate which was added portionwise with stirring to give a final solution pH of 1.5. On completion of the addition the solution was set aside and allowed to crystallise.

The resulting precipitate after collection, washing and drying gave 4.6 g of product. The weight loss on calcination was 59.4% giving a zirconium content of 10% based on zirconia and a total zirconia recovery of 89%.

The zirconia produced by the calcination of the first crop of crystals of the zirconium composition was analysed using the same technique as that given in Example 2. The zirconia produced was a white powder and found to contain:

yttrium 65 ppm; uranium 12 ppm; thorium 13 ppm; iron 2 ppm; titanium 27 ppm; calcium 13 ppm; potassium 8 ppm; and chlorine 89 ppm.

Using this analytical method the silicon and aluminium content of the sample was found to be less than that of the standard.

EXAMPLE 11

A zirconium sulfate solution was prepared according to the method of Example 1. Analysis gave a zirconium content of 117 grams per liter (expressed as zirconia) and a sulfate content of 181 grams per liter.

To 100 ml of the above solution was added 23 ml of aqueous ammonium hydroxide (16.5%) with vigorous stirring.

On completion of the addition the pH of the resulting solution was 1.0 and it was allowed to stand for 48 hours.

The resulting crystalline precipitate was collected by filtration and washed with absolute alcohol. After drying in an air oven at 100° C. the product (17.6 g) was calcined at 1000° C. to give 8.3 g of zirconia which represents a zirconium recovery of 82%.

The zirconia, a white powder, produced by calcination was analysed using the same technique as that given in Example 2 and found to contain:

yttrium 143 ppm; uranium 37 ppm; thorium 25 ppm; iron 14 ppm; titanium 17 ppm; calcium 8 ppm; potassium 23 ppm; chlorine 195 ppm; silicon 56 ppm; and aluminium 9 ppm.

EXAMPLE 12

A zirconium sulfate solution having a zirconium content of 119.8 grams per liter (expressed as zirconia) and a sulfate content of 303.3 grams per liter (expressed as sulfur trioxide) was prepared.

To this solution was added with vigorous stirring sufficient ammonium sulfate to give an ammonia concentration of 24.9 grams per liter (expressed as ammonia). On completion of the addition the solution was allowed to stand and the resulting precipitate was collected by filtration. The product was dried and then calcined to give zirconia (88.5% recovery based on zirconia.

The zirconia produced by calcination was analysed using the same technique as that given in Example 2 and was found to contain:

yttrium 182 ppm; uranium 8 ppm; thorium 24 ppm; iron 136 ppm; titanium 108 ppm; calcium 108 ppm; potassium 29 ppm; silicon 92 ppm; and aluminium 134 ppm.

COMPARATIVE EXAMPLE

This example demonstrates the improved purity of zirconia made by calcination of an ammonium zirconium sulfate composition prepared according to the process of the present invention in comparison to zirconia made by the calcination of hydrous zirconia precipitated from zirconium sulfate solution by the addition of base to give a solution pH of 4.0.

The procedure of Example 1 was repeated except that sufficient aqueous ammonia was added to give a final solution pH of 4.0. A thick gelatinous precipitate of hydrous zirconia was formed which was very difficult to collect by filtration and to wash.

A sample of the hydrous zirconia was oven dried and then calcined at 1000° C. for two hours to give zirconia. The zirconia was analysed following the technique described in Example 2 and the results are given below in comparison with the results obtained in Example 2 from the product prepared according to the process of the present invention as described in Example 1.

|  | Impurity Content of Zirconia (ppm) | |
| --- | --- | --- |
| Impurity | From Hydrous Zirconia (Comparative Example) | From Composition of Example 1 |
| Yttrium | 343 | 69 |
| Uranium | 71 | 18 |
| Thorium | 193 | 12 |
| Iron | 329 | 39 |
| Titanium | 418 | 15 |
| Calcium | 0 | BS |
| Potassium | 6 | 29 |
| Silicon | 0 | BS |
| Aluminium | 378 | BS |

(BS indicates a content below that of the analytical standard used).

We claim:

1. A process for the preparation of zirconium compositions which on calcination form zirconia, which process comprises:
    preparing an aqueous zirconium sulphate solution of pH not greater than zero;
    adding an ammonia source to said zirconium sulphate solution until the pH of said solution is in the range of from 0.1 to 2.5 whereby crystalline ammonium zirconium sulfate is precipitated; and
    collecting the thus precipitated crystalline ammonium zirconium sulfate, by separating the same from the remaining solution, said separated sulfate being suitable for calcining to provide zirconia.

2. A process according to claim 1 wherein said ammonia source is selected from anhydrous ammonia, aqueous ammonium hydroxide, ammonium salts and compounds and compositions which in said aqueous zirconium sulfate solution generate ammonia or a salt thereof.

3. A process according to claim 1 wherein said ammonia source is added until the pH of said solution is in the range of from 1.0 to 2.0.

4. A process according to claim 1 wherein said aqueous zirconium sulfate solution has a zirconium content of greater than 75 grams per liter (expressed as the oxide $ZrO_2$) and a sulfate content of greater than 180 grams per liter (expressed as $SO_4$) and the amount of ammonia source added is sufficient to give a molar ammonia concentration of twice the difference in molar concentration of the sulfate and zirconium.

5. A process according to claim 1 wherein said ammonia source is selected from aqueous ammonium hydroxide and ammonia.

6. A process according to claim 1 wherein said ammonia source is ammonium sulfate.

7. A process for the purification of a zirconium compound which process comprises:
    converting the zirconium compound to zirconium sulfate by treatment of the zirconium compound with concentrated sulfuric acid;
    dissolving the zirconium sulfate in water to form an aqueous solution of zirconium sulfate;
    preparing a zirconium composition from said aqueous zirconium sulfate solution according to the process of claim 1; and
    converting said zirconium composition to the required zirconium compound.

8. A process according to claim 7 for the purification of zirconia.

9. A process according to claim 7 wherein said zirconium composition is converted to zirconia by calcination.

10. A process for the purification of zirconia which process comprises:
    leaching a crude zirconia-containing material with concentrated sulphuric acid at a temperature in the range of from 200° to 400° C. and collecting the insoluble product formed on cooling;
    leaching the insoluble product with water to yield an aqueous solution of zirconium sulphate;
    preparing a zirconium composition from said aqueous zirconium sulfate solution according to the process of claim 1; and
    calcining the zirconium composition to give zirconia.

* * * * *